Jan. 20, 1959    JOBU YASUMURA    2,870,321
WELDING DEVICE TO ATTACH TRANSDUCER WIRES TO MECHANICAL FILTERS
Filed March 21, 1957    3 Sheets-Sheet 1
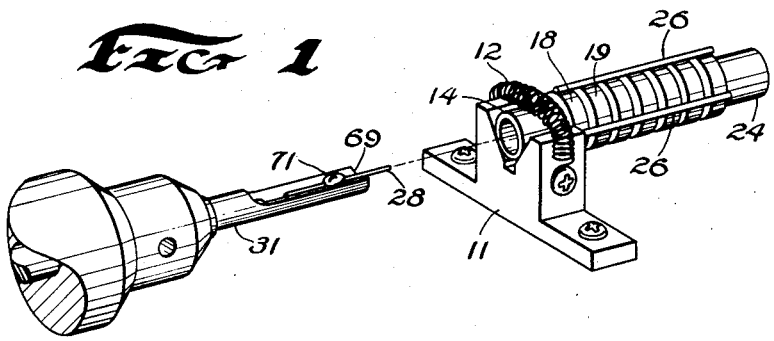
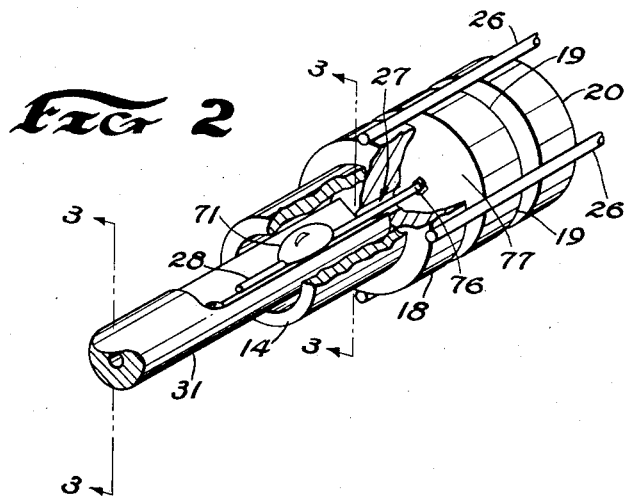
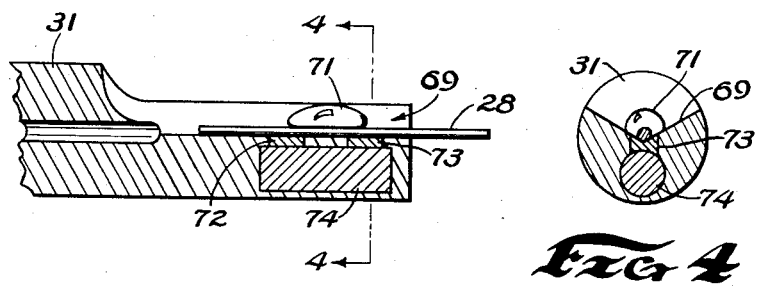
INVENTOR.
JOBU YASUMURA
BY *Marvin Moody*
ATTORNEY INVENTOR.
JOBU YASUMURA
BY Mari Moody
ATTORNEY

United States Patent Office 2,870,321
Patented Jan. 20, 1959

2,870,321

WELDING DEVICE TO ATTACH TRANSDUCER WIRES TO MECHANICAL FILTERS

John Yasumura, Tujunga, Calif., assignor to Collins Radio Company, Cedar Rapids, Iowa, a corporation of Iowa Application March 21, 1957, Serial No. 647,587

6 Claims. (Cl. 219—97)

This invention relates in general to an automatic machine for attaching end wires to electro-mechanical filters such as shown in Patent No. 2,693,580. Electro-mechanical filters such as illustrated in Patent No. 2,693,580 operate by converting electrical energy to mechanical energy, filtering it, and then re-converting it back to electrical energy. Previously it has been customary to attach the driving and output wires to the first and last discs by a staking process. After the wire has been staked into the disc, it is further fastened by soldering around the periphery of the wire. Another method previously used is to punch a V into the center of the end disc, fill the V with solder, and sand smooth. A transducer wire is then gently pressed into the V-shaped hole and the assembly is put into an oven and heated to melt the solder and attach the transducer wire to the end disc. The present invention eliminates the above methods of attaching the transducer wires and automatically attaches the wires to the remaining portions of an electro-mechanical filter.

It is an object, therefore, to provide a machine for automatically welding an electric transducer wire to an end disc of an electro-mechanical filter.

Another object of this invention is to provide automatic means for attaching a transducer wire to an electro-mechanical filter.

A feature of this invention is found in the provision for a holding mechanism for holding the main portion of the filter, a plunger which holds an end wire for moving within the confines of the electro-mechanical filter, a welding machine connected between the plunger and the filter so that spot welding occurs between the end wire and the filter, and a timing means for the welder and plunger.

Further objects, features and advantages of this invention will become apparent from the following description and claims when read in view of the accompanying drawings, in which:

Figure 1 is an enlarged detail view of the end of the plunger carrying the transducer wire and the V block which holds the mechanical filter;

Figure 2 shows the transducer wire and filter in engagement;

Figure 3 is a sectional view taken on line 3—3 from Figure 2;

Figure 4 is a sectional view taken on line 4—4 from Figure 3;

Figure 5:
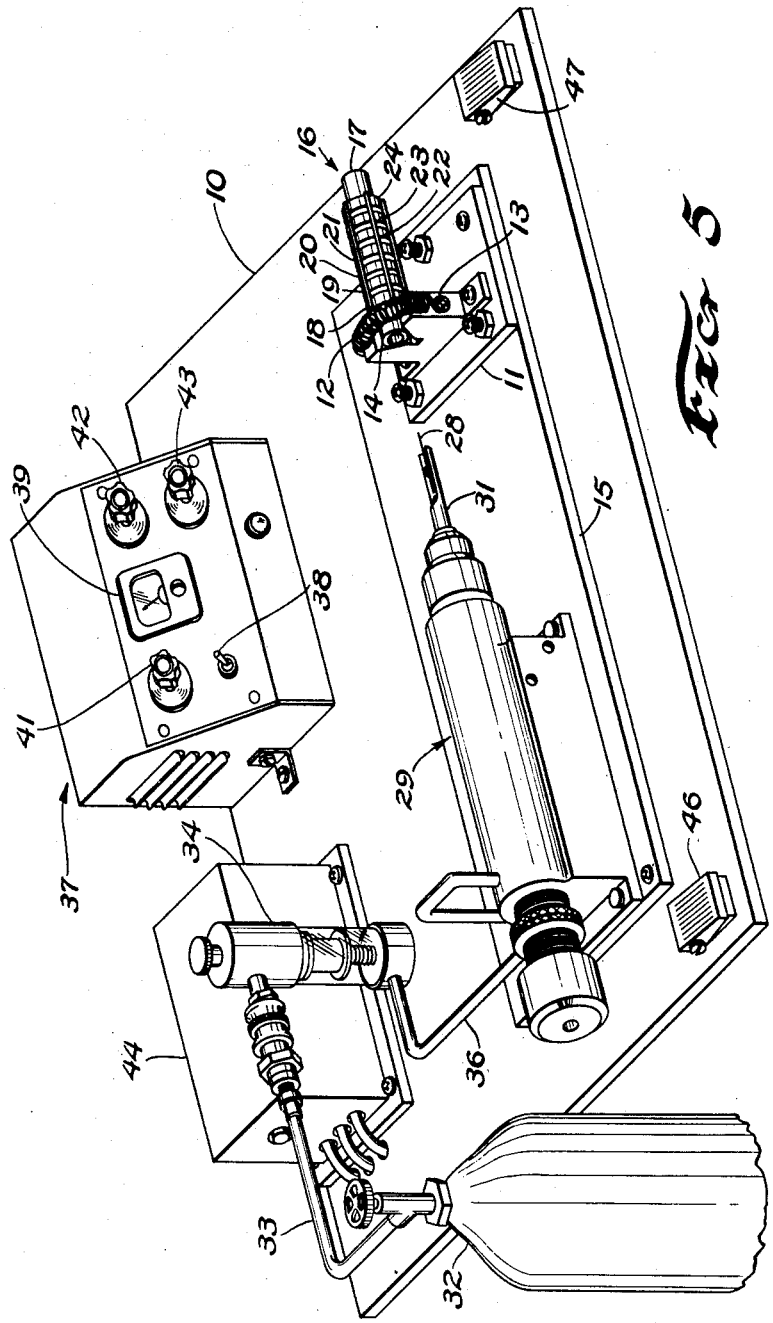
Figure 5 is a perspective view of the apparatus of this invention.

Figure 5 shows a plate 10 which has mounted thereon a board 15 of insulating material. The board supports a V block 11 which carries a spring 12 that attaches to the V block by screws 13. Spring 12 holds a cylinder 14 of an electro-mechanical filter 16. The electro-mechanical filter 16 comprises the cylinders 14 and 17 at either end thereof, a plurality of discs 18, 19, 20, 21, 22, 23, and 24 which are mounted between the cylinders 14 and 17 and are supported by coupling wires 26. The end discs 18 and 24 are formed with central openings 27 as best shown in Figure 2. The first and last active discs 19 and 23 must have end transducer wires 28 attached, and the present apparatus performs this function.

A plunger actuating means 29 comprises a transducer holder 31 which carries a transducer wire 28. Actuating means 29 is mounted on the board 15. A bottle 32 of compressed air has an outlet pipe 33 that passes to an electrically operated valve 34. Valve 34 has an outlet tube 36 that passes to actuating means 29. Actuating means 29 has a spring bias plunger which is connected to the holder 31.

A spot-welding machine 37 is also mounted on the plate 10 and has an "off" and "on" switch 38. A meter 39 and current, voltage, and temperature controls 41, 42, and 43, are also mounted on welder 37.

A master control unit 44 is also mounted on the plate 10 and is interlocked with safety switches 46 and 47 mounted on the plate 10.

Figure 6:
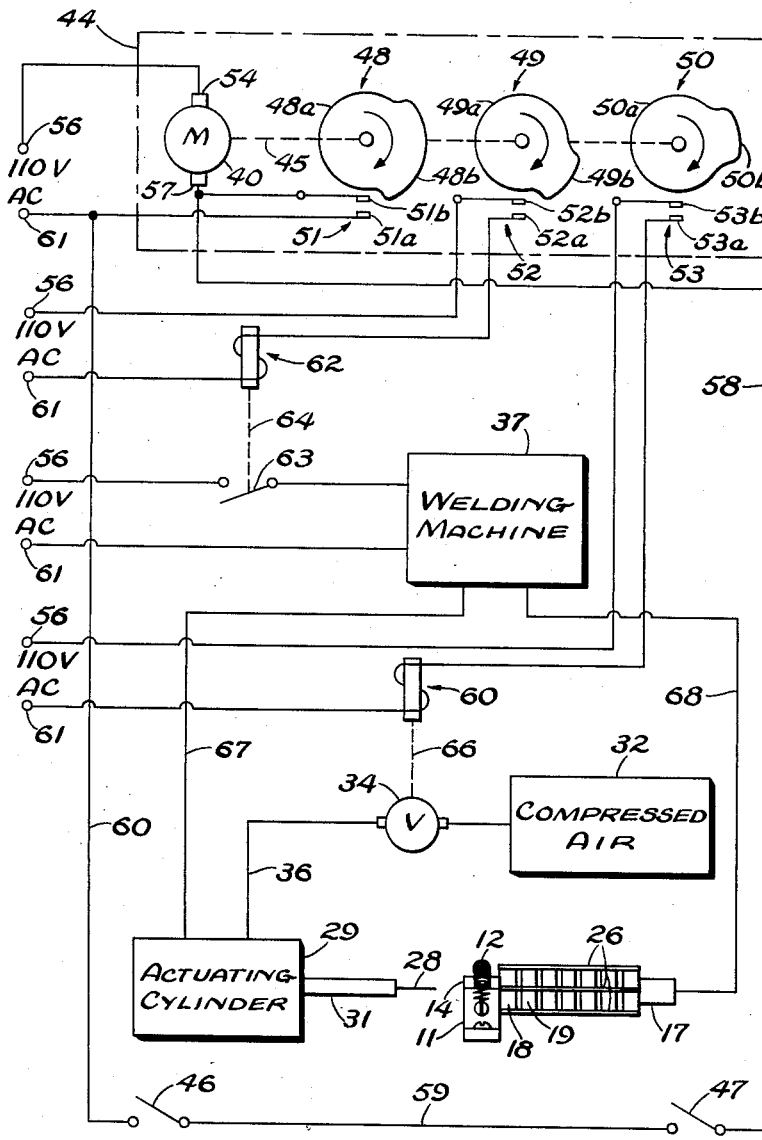
Figure 6 is an electrical schematic of the apparatus of this invention.

As shown in Figure 6, the control unit 44 includes a motor 40 which has its output shaft 45 connected to rotatable cams 48, 49, and 50. Cams 48, 49, and 50 have high and low portions, the low portions being indicated as 48a, 49a, and 50a, respectively, and the high portions being indicated as 48b, 49b, and 50b, respectively. Switches 51, 52, and 53 are mounted adjacent the cams 48, 49, and 50 and are closed when the high portions 48b, 49b, and 50b are in engagement with the movable portions 51b, 52b, and 53b of the switches and are open when the low portions 48a, 49a, and 50a are in engagement with the movable portions of the switches.

One side 54 of the motor 40 is connected to the first side 56 of a power supply. The other side of the motor 57 is connected by a lead 58 in series with safety switches 47 and 46. Lead 59 connects switches 47 and 46. A return lead 60 is connected between switch 46 and the other side 61 of the power supply. The other side 61 of the power supply is also connected to one side 51a of switch 51. The movable contact 51b of switch 51 is connected to the first side 56 of the power supply.

The second cam 49 actuates the switch 52 which has a stationary contact 52a and a movable contact 52b. Movable contact 52b is connected to one side 56 of the power supply, and stationary contact 52a is connected to the actuating coil of a relay 62 which has its opposite side connected to the other side 61 of the power supply. Relay 62 actuates a switch 63 by means of a mechanical connection 64. Switch 63 when closed supplies power to the welding machine 37 from the power supply. The third switch 53 has a stationary contact 53a and a movable contact 53b. Movable contact 53b is connected to one side 56 of the power supply, and the movable contact 53b is connected to the actuating coil of a relay 60. The other side of the relay is connected to the other side 61 of the power supply. The relay 60 has a mechanical linkage 66 which operates the valve 34.

The relay 62 closes switch 63, which supplies power to the welding machine 37. The welding machine supplies current to a pair of leads 67 and 68. Lead 67 is connected electrically to the plunger of the actuating cylinder 29 and the magnetostrictive wire holding member 31. The other lead 68 is connected to the electro-mechanical filter through the V block 11.

In operation an operator places the mechanical filter in the V block 11 as shown in Figure 1. This automatically signs the hollow cylinder 14, the opening 27 formed through disc 18, and the center of the first active disc 19 to which the magnetostrictive wire is to be attached. The magnetostrictive wire 28 is placed in a groove 69 formed in the holding member 31 and a small amount of mercury 71 is placed in the V-shaped holder 69 so as to make good electrical contact with the wire 28. A portion of the wire 28 is allowed to extend beyond the end of the holder. A pair of small copper inserts 72 and 73 are mounted within the holder 31 so as to make good electrical contact between the magnetostrictive wire 28 and the holder. A magnet 74 is mounted in the holder 31 to firmly hold wire 28 thereto.

In operation, the operator places his hands on switches 46 and 47 to close them. This closes the circuit to the motor 40 and the motor starts to rotate. As the motor starts to rotate in a clockwise direction relative to Figure 6, high portion 48b of cam 48 closes switch 51 which causes the motor to continue to operate until the sequence has been completed and until the low portion 48a of the cam 48 is opposite the switch 51. Thus, the motor will continue to operate even though the operator removes his hands once the operation has commenced. The cam 49 closes switch 52 which actuates the relay 62, thus closing the switch 63 which energizes the welding machine 37. This applies a potential through leads 67 and 68 between the transducer wire 28 and the mechanical filter 19. However, since these are insulated from each other because board 15 is made of insulating material, no current flows at this time. This potential remains on the wire and the active disc 19 for a time.

The cam 50 has a high portion 50b which closes switch 53. This causes relay 60 to open valve 34 which causes the actuating cylinder 29 to move the transducer holder 31 and wire 28 to the right and within the confines of the cylinder 14 through the opening 27 in the disc 18 until the end 76 of the transducer wire 28 comes within close proximity of the surface 77 of the disc 19. Before they touch, an arc jumps from the end 76 of the transducer wire to the surface 77 due to the high potential supplied by the welder 37. When this occurs, the end 76 of the wire and the area closely adjacent to the end 76 on the surface 77 become liquified due to the intense heat of the arc. This occurs before the member 31 has reached the end of its travel. It continues toward the disc 19, thus pushing the end 77 of the transducer wire 28 into the liquid puddle of metal formed on end 77 of the disc 19. This immediately extinguishes the arc, since the current has a direct path through the disc at this time. The cam 49 is so timed that the low side 49a turns the current off soon after this. The low side of cam 50, 50a, then opens switch 53 which closes valve 34 thus allowing the actuating plunger 29 to retrack and withdraw the member 31. The transducer wire, however, remains in a fixed, aligned position firmly attached to the disc 19 due to the welding operation which occurs between surface 77 and the end 76. This metal freezes very rapidly after termination of the arc to firmly support the end wire 28 by the time plunger 29 is withdrawn. The welding machine is set to a voltage so that sufficient heat is generated to melt the contact face of the disc 77 and the end of transducer wire 28. The two melted portions are then brought together and allowed to freeze so that the weld will be formed.

After the plunger 31 has turned to its withdrawn position, portion 48a of the cam 48 allows switch 51 to open, thus stopping the motor until a new cycle is commenced.

The mechanical filter is removed from beneath the spring 12 and cylinder 24 is placed under it. Another end wire is placed in holder 31 and welded to the last active disc 23. The cycle is repeated by depressing the two switches 46 and 47.

This invention allows end wires to be automatically welded to discs of electro-mechanical filters and prevents timely, tedious handling of the parts by staking and other prior methods.

Although this invention has been described with respect to particular embodiments thereof, it is not to be so limited as changes and modifications may be made therein which are within the full intended scope of the invention as defined by the appended claims.

What is claimed is:

1. An automatic positioning and welding machine for attaching a first electrically conductive work piece to a second electrically conductive work piece comprising, a base plate, a first work-holding member attached to said base plate and electrically insulated therefrom, a plunger actuating cylinder mechanism attached to said base plate and electrically insulated therefrom, said mechanism being space separated from and in substantially axial alignment with said first work-holding member, a second work-holding member attached to said actuating cylinder mechanism and electrically connected thereto, said second work holding member including means to hold said second work piece in axial aligned slidable engagement therewith while maintaining consistently uniform electrical contact therebetween, a welding machine, the output terminals of said welding machine connected respectively to said actuated plunger and said first work-holding member, and sequential switching means to control the operation of said actuating cylinder and to control the energization of said welding machine such that a predetermined sequence of arcing, melting, and impacting is realized to firmly join said first and second work pieces held respectively in said first and second work-holding members.

2. An automatic positioning and welding machine for attaching a first electrically conductive work piece of small volume to a second electrically connected work piece of a substantially greater volume comprising, a base plate, an insulating plate attached to said base plate, a first work-holding member attached to said insulating plate, an actuating cylinder mechanism attached to said insulating plate in a space separated axial alignment with said first holding member, a plunger received in said actuating cylinder, said plunger adapted to be moved co-axially within said cylinder, a second work-holding member attached to the end of said plunger, actuating means for said actuating cylinder, a welding machine mounted on said base member, one output terminal of said welding machine electrically connected to said plunger, the other output terminal of said welding machine electrically connected to said first work-holding member, a master control unit, said master control unit being adapted to sequentially control the movement of said plunger, the application of output voltage from said welding machine, and the withdrawal of said plunger in a predetermined time sequence whereby a welding arc is drawn and controlled between said work pieces held respectively in said first and second work-holding members as the two pieces are brought into a predetermined spacial alignment with one another.

3. An automatic work positioning and welding machine as described in claim 2 wherein said master control means comprises a plurality of cam-operated switches, a drive motor, a plurality of cams simultaneously positioned by said motor to sequentially close co-operating switches, a first one of said cams operating a first switch to energize said welding machine, and a second one of said cams operating a second switch to operate said plunger activating means.

4. An automatic positioning and welding device for attaching the end of a fine wire to a plane surface member comprising first and second work-holding members mounted in spaced relationship on a base member and electrically insulated from one another, said first work-holding piece being a V-shaped block; said second work-holding member comprising an actuated plunger and a grooved member attached to the end of said plunger, said grooved member being in substantially axial alignment with said V block; means for applying a welding voltage across said V block and said plunger, means for activating said plunger for movement transversely with respect to said base member whereby said grooved member is positioned to approach and withdraw from said V block, said wire placed in said grooved member, magnetic means for holding said wire within said grooved member, spring means for retaining said plane surface member in said V block, and cam-operated sequential switching means to bring said wire and said plane surface into a predetermined spacial relationship whereby a welding arc is drawn and controlled between the end of said wire and said plane surface.

5. An automatic positioning and welding device for attaching an end wire to an electro-mechanical filter assembly wherein said electro-mechanical filter comprises a pair of cylinders at either end thereof, a plurality of discs mounted in spaced parallel relationship between said cylinders and supported by coupling wires, first and second end discs attached to said cylinders and formed with central openings therein, said device comprising a base plate, a first work-holding member attached to said base plate and electrically insulated therefrom, an actuating cylinder mechanism attached to said base plate and electrically insulated therefrom, said mechanism positioning a plunger, a second work-holding member attached to the end of said plunger, said second work-holding member being formed with a V-shaped groove extending longitudinally therein, means for positioning and holding said mechanical filter assembly within said first work-holding member, said end wire positioned within the groove in said second work-holding member with a portion of said wire extending therefrom, magnetic means for holding said end wire within said second work-holding member, means for actuating said plunger for movement within said cylinder transverse to said base member, a welding machine, the output terminals from said welding machine connected respectively to said plunger and said first work-holding member, and cam-operated sequential switching means for controlling the movement of said plunger and for controlling the energization of said welding machine in a predetermined time sequence such that said end wire is positioned axially through the opening in said end disc of said mechanical filter and in close proximity to the surface of the adjacent disc such that an arc is drawn, controlled, and extinguished between said end wire and said adjacent disc to form a weld therebetween.

6. An automatic positioning and welding device as described in claim 5 wherein said first work-holding member is formed as a wedge-shaped block and said magnetic holding means for said second work-holding member comprises a magnet contained within said work-holding member, said magnet being positioned within said second work-holding member beneath said V-shaped groove, a quantity of mercury contained within said groove, and a copper insert formed into the bottom of said groove whereby said wire is held in sliding axial alignment within said groove and is maintained in electrical contact with said second work-holding member.

References Cited in the file of this patent

UNITED STATES PATENTS

| | | |
|---|---|---|
| 1,434,285 | Gale | Oct. 31, 1922 |
| 2,002,007 | Hauson | May 21, 1935 |